(12) United States Patent
Zhang et al.

(10) Patent No.: US 8,638,764 B2
(45) Date of Patent: Jan. 28, 2014

(54) MOBILE TELECOMMUNICATIONS ARCHITECTURE

(75) Inventors: Yan Zhang, Bellevue, WA (US); Ahmed Tariq, Port Coquitlam (CA)

(73) Assignee: Broadcom Corporation, Irvine, CA (US)

( * ) Notice: Subject to any disclaimer, the term of this patent is extended or adjusted under 35 U.S.C. 154(b) by 639 days.

(21) Appl. No.: 12/290,870

(22) Filed: Nov. 3, 2008

(65) Prior Publication Data

US 2009/0135797 A1 May 28, 2009

Related U.S. Application Data

(60) Provisional application No. 61/001,749, filed on Nov. 2, 2007.

(51) Int. Cl.
H04W 4/00 (2009.01)
H04B 7/00 (2006.01)

(52) U.S. Cl.
USPC .................................... 370/338; 370/310.1

(58) Field of Classification Search
USPC ............................................ 709/338; 370/338
See application file for complete search history.

(56) References Cited

U.S. PATENT DOCUMENTS

| | | | | |
|---|---|---|---|---|
| 6,246,878 | B1 * | 6/2001 | Wallentin | 455/442 |
| 6,990,089 | B2 * | 1/2006 | Benedyk et al. | 370/338 |
| 7,313,108 | B2 * | 12/2007 | Scobbie | 370/328 |
| 7,454,210 | B2 * | 11/2008 | Rinne et al. | 455/442 |
| 8,089,938 | B2 * | 1/2012 | Bosch et al. | 370/332 |
| 2002/0027993 | A1 * | 3/2002 | Vanttinen | 380/258 |
| 2003/0152048 | A1 * | 8/2003 | Soininen et al. | 370/328 |
| 2003/0185190 | A1 * | 10/2003 | Chitrapu et al. | 370/338 |
| 2003/0190915 | A1 * | 10/2003 | Rinne et al. | 455/436 |
| 2003/0216140 | A1 * | 11/2003 | Chambert | 455/426.1 |
| 2004/0198344 | A1 * | 10/2004 | Pitt et al. | 455/426.1 |
| 2004/0235473 | A1 * | 11/2004 | Sanchez | 455/435.2 |
| 2004/0252660 | A1 * | 12/2004 | Ahmavaara | 370/328 |
| 2006/0084470 | A1 * | 4/2006 | Hashimoto et al. | 455/552.1 |
| 2006/0099951 | A1 * | 5/2006 | Park | 455/439 |
| 2007/0015500 | A1 * | 1/2007 | Parmar et al. | 455/422.1 |
| 2007/0097938 | A1 * | 5/2007 | Nylander et al. | 370/338 |
| 2007/0097939 | A1 * | 5/2007 | Nylander et al. | 370/338 |
| 2007/0097983 | A1 | 5/2007 | Nylander et al. | |
| 2007/0123260 | A1 * | 5/2007 | Kim et al. | 455/436 |
| 2007/0183347 | A1 * | 8/2007 | Gu et al. | 370/258 |
| 2008/0089309 | A1 * | 4/2008 | Groleau et al. | 370/342 |
| 2008/0186927 | A1 * | 8/2008 | Alam et al. | 370/338 |
| 2009/0003263 | A1 * | 1/2009 | Foster et al. | 370/328 |
| 2010/0189035 | A1 * | 7/2010 | Pehrsson et al. | 370/328 |
| 2011/0104462 | A2 * | 5/2011 | Berteau et al. | 428/212 |

FOREIGN PATENT DOCUMENTS

CN 1662089 8/2005

* cited by examiner

*Primary Examiner* — Gerald Smarth

(74) *Attorney, Agent, or Firm* — Sterne, Kessler, Goldstein & Fox PLLC

(57) ABSTRACT

A mobile telecommunications architecture is disclosed. A downlink mobile telecommunications signaling message is received via a first communication interface associated with a single shared network controller connection to a mobile switching center (MSC) server. The downlink mobile telecommunications signaling message is mapped to one of a plurality of small scale base stations each of which is configured to perform at least some network controller functions.

20 Claims, 10 Drawing Sheets

800

| SCCP ID | SCTP stream |
|---|---|
|  |  |
|  |  |
|  |  |
|  |  |
|  |  |
|  |  |
|  |  |
|  |  |

FIG. 8

MOBILE TELECOMMUNICATIONS ARCHITECTURE

CROSS REFERENCE TO OTHER APPLICATIONS

This application claims priority to U.S. Provisional Patent Application No. 61/001,749 entitled MOBILE TELECOMMUNICATIONS ARCHITECTURE filed Nov. 2, 2007 which is incorporated herein by reference for all purposes.

BACKGROUND OF THE INVENTION

Traditionally connectivity to a mobile telecommunications network, such as a mobile telephone network, has been provided via a mobile switching center (MSC), e.g., an MSC server. Each MSC server traditionally connected via network connections to a relatively limited number of radio network controllers (RNC), in UMTS parlance, or base station controllers (BSC) in GSM network terminology. Each such controller typically connected to and controlled a number of macrocellular bases stations, referred to as "node B" in UMTS terminology and as base transceiver stations (BTS) in a GSM network. Each controller typically had a T-1 or similar connection to each base station. Each base station included a large tower or other structure on which one or more transceivers were mounted to provide coverage for users who transited a coverage area or "cell" with which the base station was associated. Since a relatively few number of base station controllers (e.g., RNC or BSC) could support collective a relatively large number of base stations, typically MSC servers (and other MSC's) have been configured to support at most a limited number of controllers (e.g., RNC or BSC), e.g., on the order of 4,000.

In recent years, femtocells and other small scale base stations have been developed and deployed. As used herein the terms "femto access point", "UMTS access point" or "UAP", and small scale base station are used interchangeably to refer to a base station that is small in size relative to a traditional macrocellular base station. Each such base station typically provides coverage for a relatively small geographic coverage area, compared to a traditional macrocellular base station, and/or for a restricted and/or otherwise limited set of subscribers.

BRIEF DESCRIPTION OF THE DRAWINGS

Various embodiments of the invention are disclosed in the following detailed description and the accompanying drawings.

FIG. 8 is a block diagram illustrating an embodiment of a data structure for storing a mapping data usable to route signaling messages to the RNC's with which they are associated.

DETAILED DESCRIPTION

Figure 1:
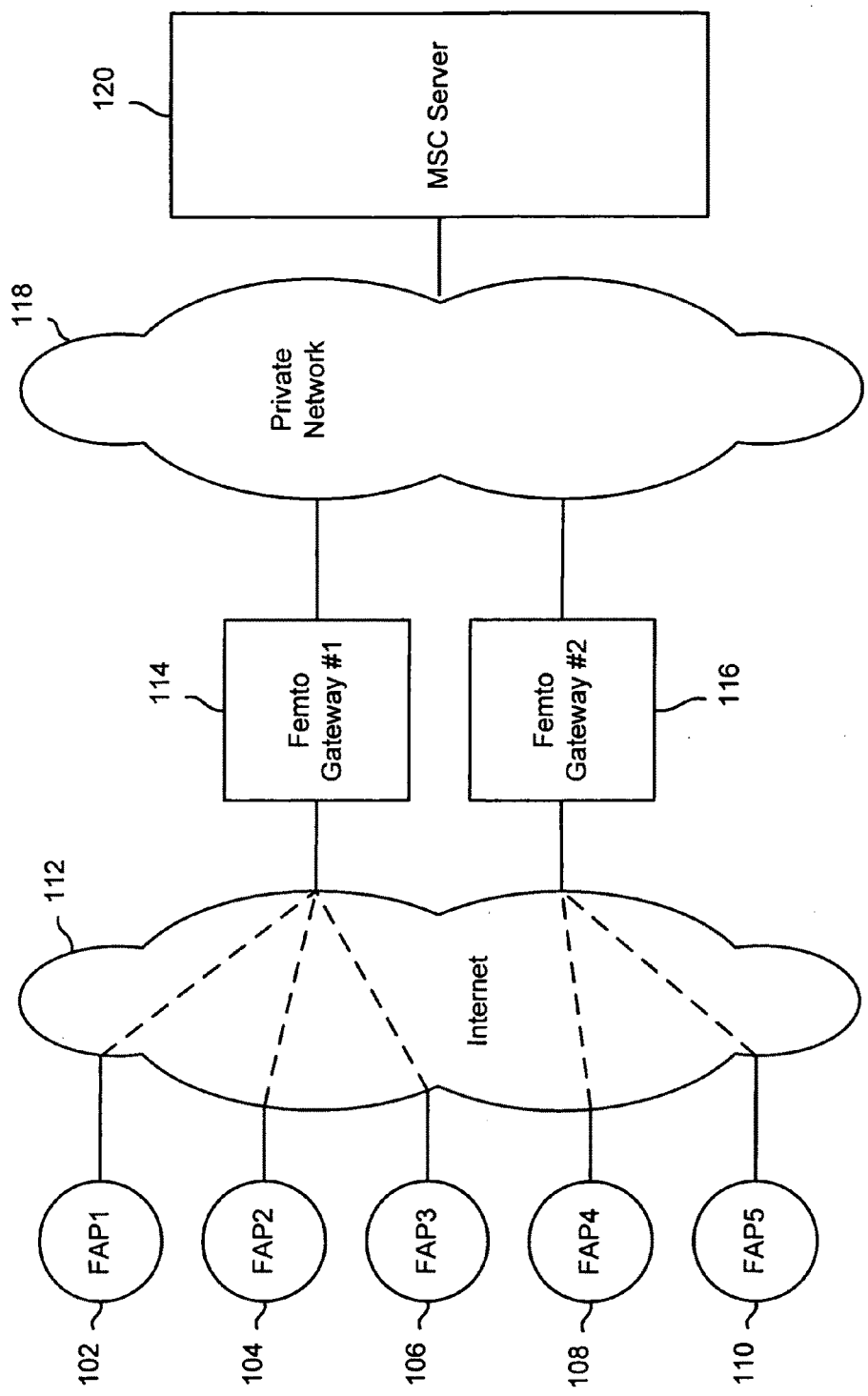
FIG. 1 is a block diagram illustrating an embodiment of a mobile telecommunications system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Projecting multiple radio network controllers (RNC) or other base station controllers to an MSC server or other MSC as a single logical controller is disclosed. As used herein the UMTS term "radio network controller" or "RNC" is used generically to reference to a UMTS RNC or a corresponding base station controller or other corresponding entity in a non-UMTS network. In some embodiments, each of a plurality of femtocells or other base stations is configured to operation at least in part as a radio network (or other base station) controller. Signaling messages and/or voice/data traffic from a plurality of such base stations is received via an IP or other public or private network and aggregated at a femtocells (or other) gateway (FGW) and provide upstream to an MSC server (or other MSC) via a single, shared RNC connection to the MSC. Downlink messages from the MSC server are mapped to individual femtocells (or other base stations) and each message is provided via the aforementioned network to the femtocell (or other base station) with which the message is associated.

FIG. 1 is a block diagram illustrating an embodiment of a mobile telecommunications system. In the example shown, each of a plurality of femto access points (FAP) 102-110, for example femtocells, connects via the Internet 112 (or another IP or other public or private network) with a corresponding one of femto gateways 114 and 116. The femto gateways connect via a private network (or other network) 118 to an MSC server 120. Note that while five FAP's are shown in FIG. 1, femtocells configured to be deployed in homes or other locations, such as offices or small businesses, could easily number in the many thousands in a relatively concentrated geographic area. In some embodiments, improved performance is provided by integrating into the femtocells or other small scale base stations, such as FAP's 102-110, the Node B functions together with functions traditionally performed by an RNC (or other base station controller). However, typically as noted above an MSC server such as MSC server 120 of FIG. 1 is configured to support at most on the order of 4,000 RNC's, while within an area typically served by an MSC server potentially hundreds of thousands of femtocells could be deployed. To address this need without requiring changes in legacy MSC servers, projecting to the MSC server as a single logical RNC multiple femtocells into which RNC functionality has been integrated is disclosed. In some embodiments, each femto gateway, such as femto gateways 114 and 116, is configured to establish with the MSC server a single (or some other number fewer than the number of base stations the femto gateway supports) RNC connection to the MSC server. Uplink messages received from the femtocells the femto gateway supports (e.g., FAP's 102, 104, and 106, in the case of femto gateway 114 in the example shown in FIG. 1) are aggregated and sent to the MSC server as a single stream, so as to appear to the MSC server as a single stream received from a single logical RNC. (Likewise, in the example shown in FIG. 1, femto gateway 116 would aggregate uplink messages from FAP 108 and FAP 110 (any other femtocells it supports) and provide them to MSC server 120 as if they were from a single logical RNC.) For downlink messages, each message is mapped, as described more fully below, to the femtocells (FAP) to which it corresponds and sent via a corresponding network connection to that femtocell.

Figure 2:
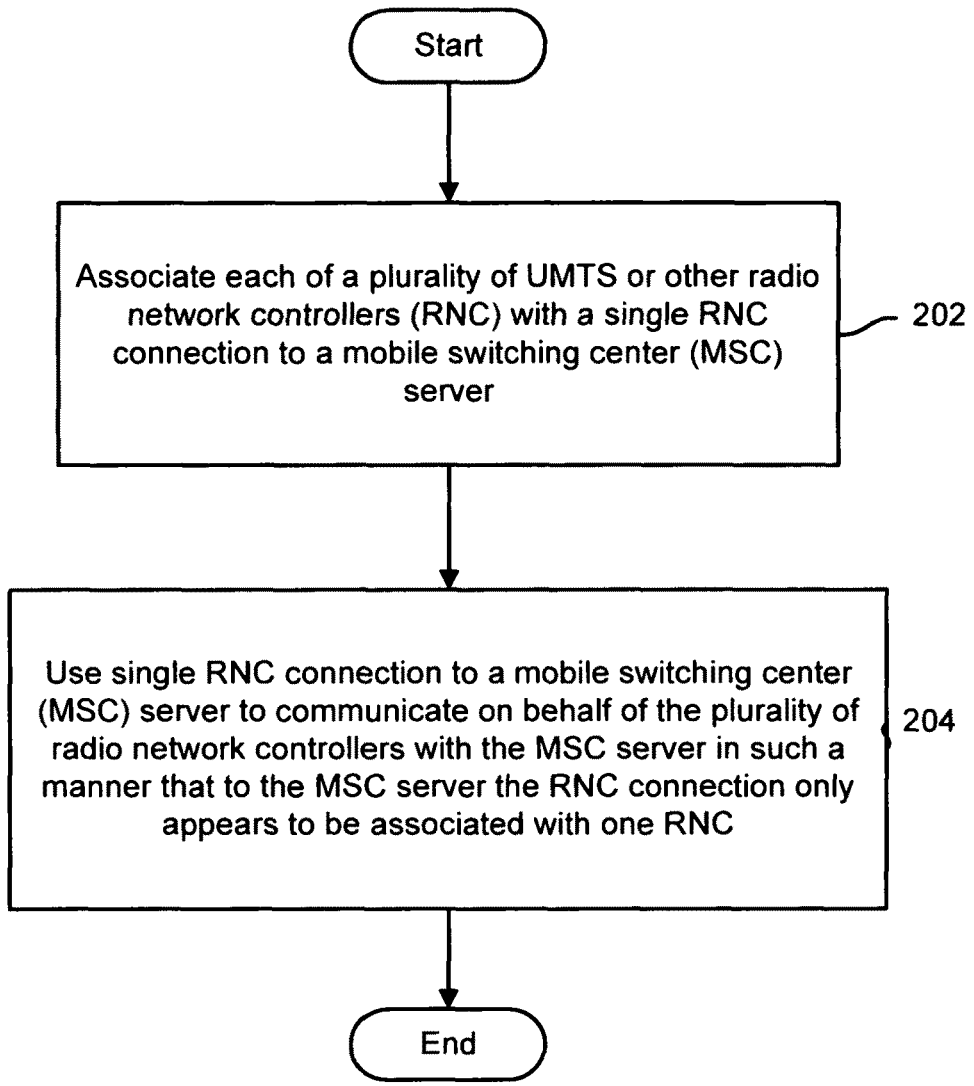
FIG. 2 is a flow diagram illustrating an embodiment of a process for providing connectivity to a mobile telecommunications network.

FIG. 2 is a flow diagram illustrating an embodiment of a process for providing connectivity to a mobile telecommunications network. In various embodiments, the process of FIG. 2 is implemented by a femto or other gateway, such as gateways 114 and 116 of FIG. 1. In the example shown in FIG. 2, each of a plurality of small scale or other base stations into which RNC (or other base station controller) functionality has been integrated is associated with a single RNC connection to an MSC server (or other MSC) (202). The single RNC connection to the MSC server is used to communicate with the MSC server on behalf of the plurality of base stations/RNC's in such a manner that to the MSC server the single RNC connection only appears to be associated with a single logical RNC (204).

Figure 3:
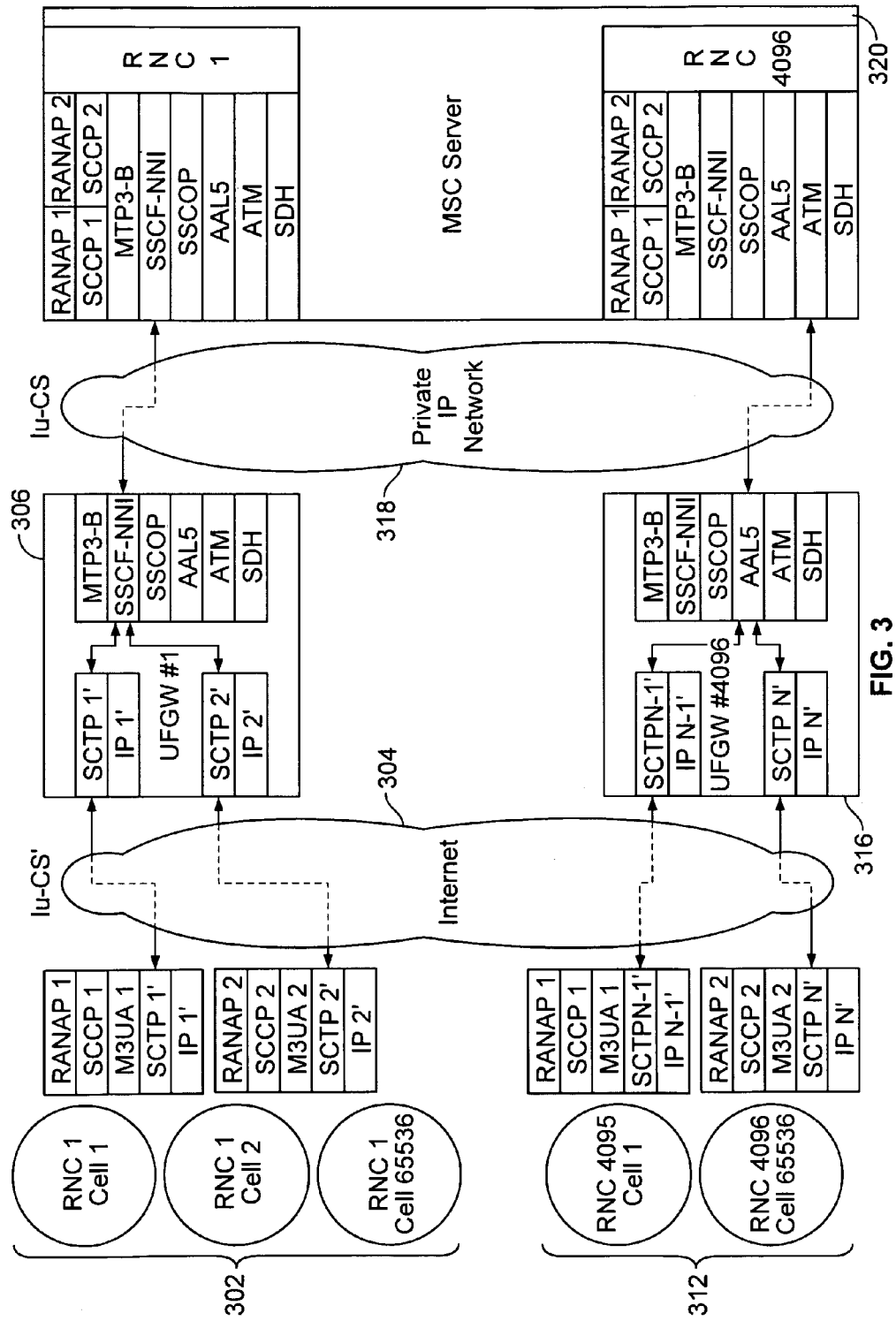
FIG. 3 is a block diagram illustrating an embodiment of a mobile telecommunications system.

FIG. 3 is a block diagram illustrating an embodiment of a mobile telecommunications system. In the example shown, RNC's 302 connect via the Internet 304 to a femto gateway 306. In some embodiments, each of at least a subset of the RNC's 302 comprises a femtocell or other small scale base station configured to serve as both a base station (e.g., node b) and as an RNC. While three RNC's are shown in FIG. 3, any number up to a maximum number of base stations that an associated MSC server can support may be included in some embodiments. Similarly, a second plurality of RNC's 312 connects via the Internet 304 with an associated femto gateway 316. Femto gateways 306 and 316 connect via a private network 318 with an MSC server 320. In the example shown, each of the RNC's 302, 312 is configured to establish with its corresponding femto gateway an stream control transmission protocol (SCTP) over IP connection. In addition, each establishes with the MSC server 320 via its serving femto gateway 306 or 316 one or more traditionally RNC-associated protocol connections or sessions, e.g., RANAP, signaling connection control part (SCCP), and M3UA in the example shown in FIG. 3. Each femto gateway 306, 316 establishes with MSC server 320 a single RNC connection via network 318, which in the example shown comprises an ATM network. Each femto gateway 306, 316 is configured to aggregate uplink messages (SCTP streams) from the femtocells/RNCs it supports and provide such uplink messages via a single RNC connection (single MTP3 over ATM connection) to MSC server 320. Downlink messages are mapped to the particular RNC (femtocells) to which they correspond and each is sent via the Internet 304 by being included in the RNC/femtocell-specific SCTP stream to which the downlink message corresponds. In various embodiments, the femto gateways 306, 316 are configured to learn and store a mapping that enables downlink messages to be routed to the correct RNC, as described more fully below.

Figure 4:
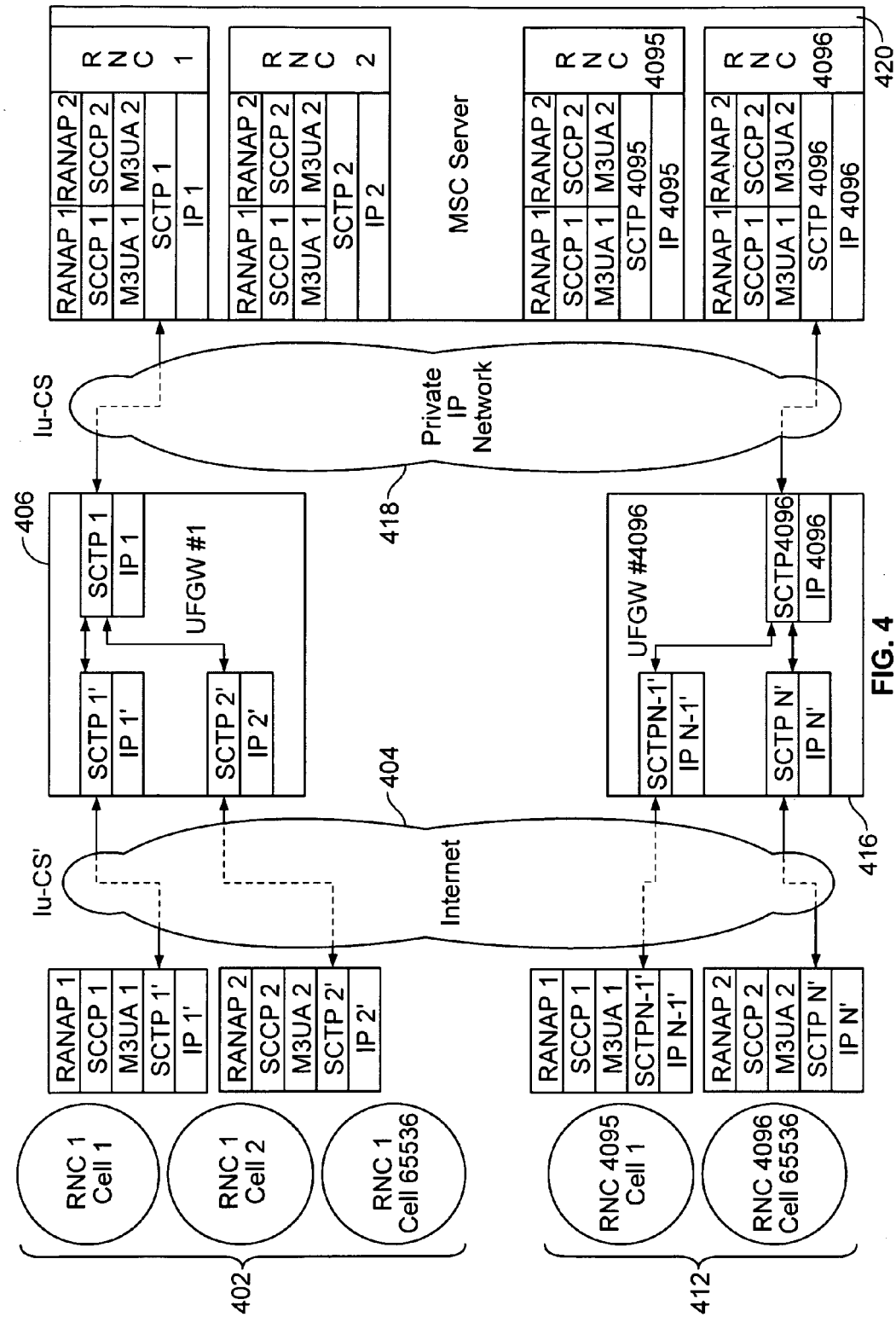
FIG. 4 is a block diagram illustrating an embodiment of a mobile telecommunications system.

FIG. 4 is a block diagram illustrating an embodiment of a mobile telecommunications system. The example shown in FIG. 4 is similar to the system shown in FIG. 3 except that connectivity to the MSC server is provided via a private IP network. In the example shown in FIG. 4, a plurality of RNC's 402 connect via the Internet 404 to a femto gateway 406. Similarly, a second plurality of RNC's 412 connects via the Internet 404 with an associated femto gateway 416. Femto gateways 406 and 416 connect via a private network 418 with an MSC server 420 via SCTP over IP connections to the MSC server 420. In the example shown, each of the RNC's 402, 412 is configured to establish with its corresponding femto gateway an SCTP over IP connection. In addition, each establishes with the MSC server 420 via its serving femto gateway 406 or 416 one or more traditionally RNC-associated protocol connections or sessions, e.g., RANAP, signaling connection control protocol (SCCP), and M3UA in the example shown in FIG. 4. Each femto gateway 406, 416 establishes with MSC server 420 a single RNC connection via network 418, which in the example shown comprises an IP network. Each femto gateway 406, 416 is configured to aggregate uplink messages (SCTP streams) from the femtocells/RNCs it supports and provide such uplink messages via a single RNC connection (single SCTP uplink stream) to MSC server 420. Downlink messages are mapped to the particular RNC (femtocells) to which they correspond and each is sent via the Internet 404 by being included in the RNC/femtocell-specific SCTP stream to which the downlink message corresponds.

Figure 5:
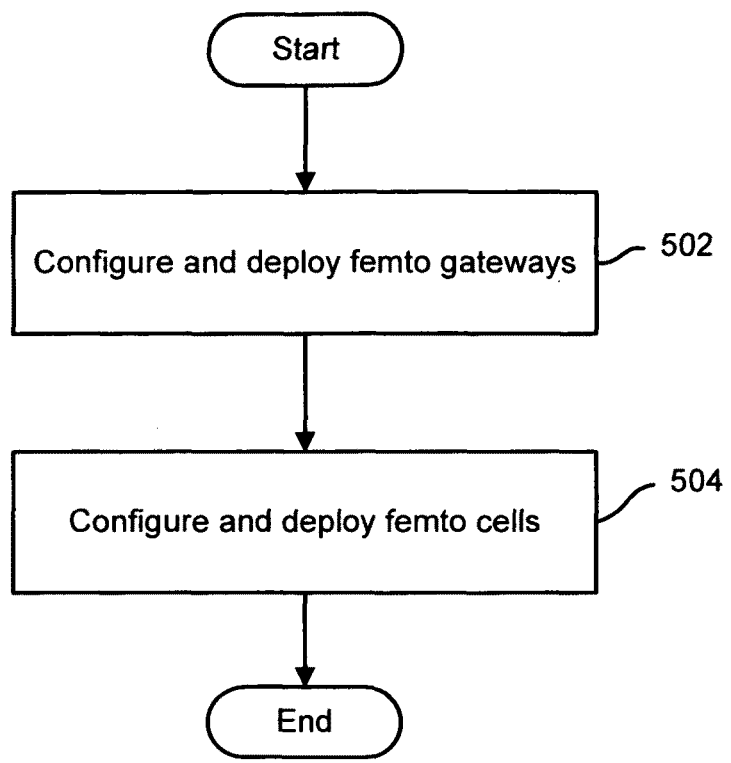
FIG. 5 is a flow diagram illustrating an embodiment of a process for configuring mobile telecommunication base stations subsystem elements.

FIG. 5 is a flow diagram illustrating an embodiment of a process for configuring mobile telecommunication base stations subsystem elements. In the example shown, one or more femto gateways are configured and deployed (502). In various embodiments, each femto gateway is configured to communicate with an MSC server on behalf of a plurality of RNC's, such as femtocells configured to perform at least some RNC functions, in a manner that makes the plurality of RNC's appear to the MSC server to be a single logical RNC. One or more femtocells are configured and deployed (504). In various embodiments, each femtocell is configured to perform one or more RNC functions. In various embodiments, each femtocell is configured to establish an SCTP over IP, or other, network connection to a serving femto gateway. Each is further configured to communicate via the femto gateway with a serving MSC server, including by establishing with the MSC server, via the femto gateway, communication sessions under one or more communication protocols traditionally used by a typical macrocellular RNC to communicate with the MSC server.

Figure 6:
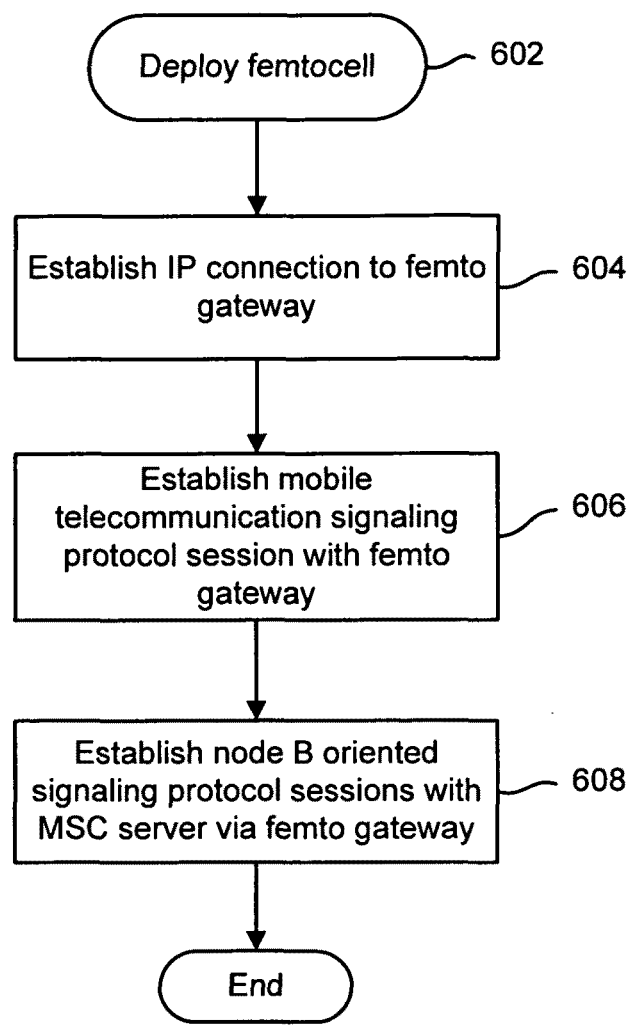
FIG. 6 is a flow diagram illustrating an embodiment of a process for deploying a femtocell.

FIG. 6 is a flow diagram illustrating an embodiment of a process for deploying a femtocell. In various embodiments a femtocell is configured to perform the process of FIG. 6 upon initially being powered up and connected to the Internet or another public or private network. In the example shown, upon deployment (602) the femtocell establishes an IP connection to a serving femto gateway (604). The femtocell establishes with the femto gateway a signaling control protocol communication session and/or connection suitable for sending and receiving mobile telecommunication signaling messages, e.g., an SCTP connection or session (606). The femtocell then establishes with a serving MSC server, via the femto gateway, communication under one or more signaling protocols traditionally used by macrocellular RNC's to communicate with the MSC server on a per base station basis, e.g., an SCCP connection or session (608).

Figure 7:
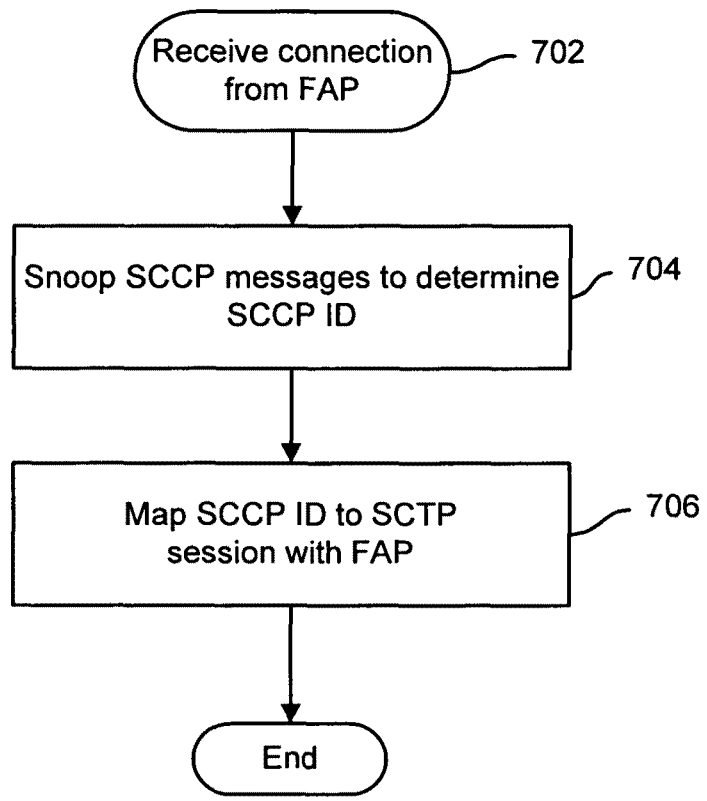
FIG. 7 is a flow diagram illustrating an embodiment of a process for establishing at a femto gateway a mapping usable to route signaling messages to the RNC's with which they are associated.

FIG. 7 is a flow diagram illustrating an embodiment of a process for establishing at a femto gateway a mapping usable to route signaling messages to the RNC's with which they are associated. In the example shown, a new connection from a femtocell or other FAP is received, e.g., at a femto gateway (702). SCCP or other messages exchanged between the FAP and a serving MSC server are snooped to determine an SCCP identifier for the new FAP (704). The SCCP (or other) identifier is mapped to a connection to the associated FAP, e.g., by storing data mapping the SCCP identifier to an SCTP over IP connection to the FAP (706).

Figure 8:
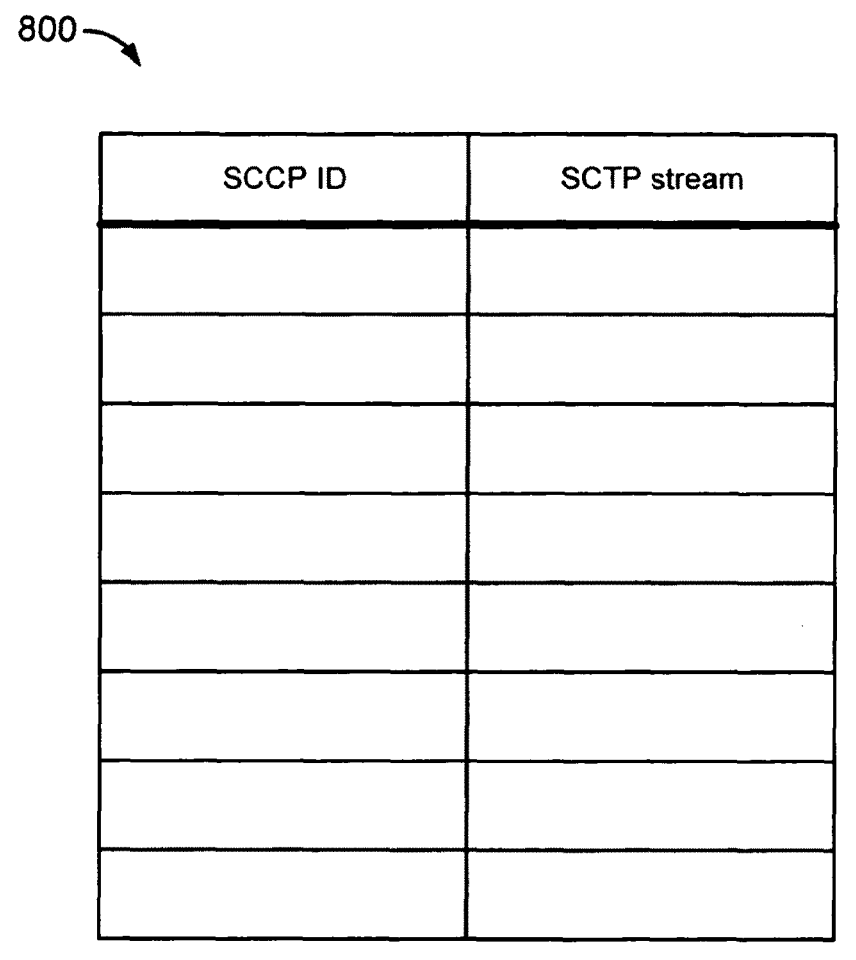

FIG. 8 is a block diagram illustrating an embodiment of a data structure for storing a mapping data usable to route signaling messages to the RNC's with which they are associated. In various embodiments, the mapping data shown is stored in a memory or other storage on a femto gateway. In the example shown, the data structure 800 includes a first column for listing a snooped SCCP identifier and a second column for listing an identifier associated with an SCTP stream (e.g., SCTP over IP connection) with which the SCCP identifier stored in the first column is associated. In some embodiments, on receiving a downlink message from the MSC server the femto gateway reads an SCCP identifier from the message and uses that value to look up in data structure 800 a corresponding SCTP stream with which the downlink message is associated.

Figure 9:
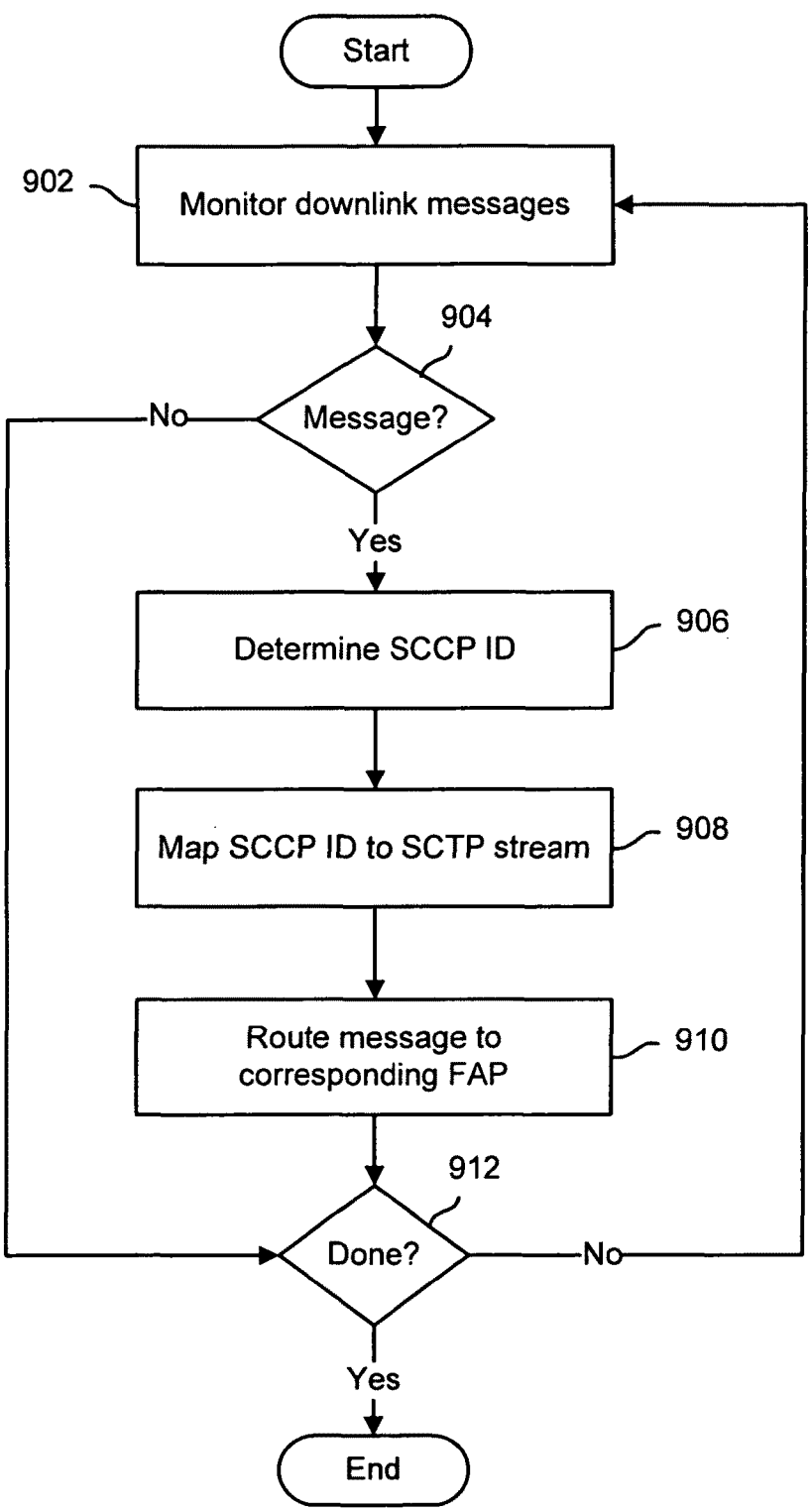
FIG. 9 is a flow diagram illustrating an embodiment of a process for routing downlink messages to RNC's.

FIG. 9 is a flow diagram illustrating an embodiment of a process for routing downlink messages to RNC's. In various embodiments the process of FIG. 9 is implemented by each of one or more femto gateways, each configured to present to the MSC server as a single logical RNC a plurality of femtocells or other FAP's configured to perform one or more RNC functions. In the example shown, downlink messages received at the femto gateway from the MSC server are monitored (902). For each downlink message that is received (904), an SCCP or other identifier is read (906) and mapped to a corresponding downlink SCTP (or other) stream (908). Each message is then sent to the RNC with which it is associated via the SCTP (or other) connection to which it has been mapped (910). The process continues as subsequent downlink messages are received (904) until done (912), e.g., until the femto gateway is taken out of service.

Figure 10:
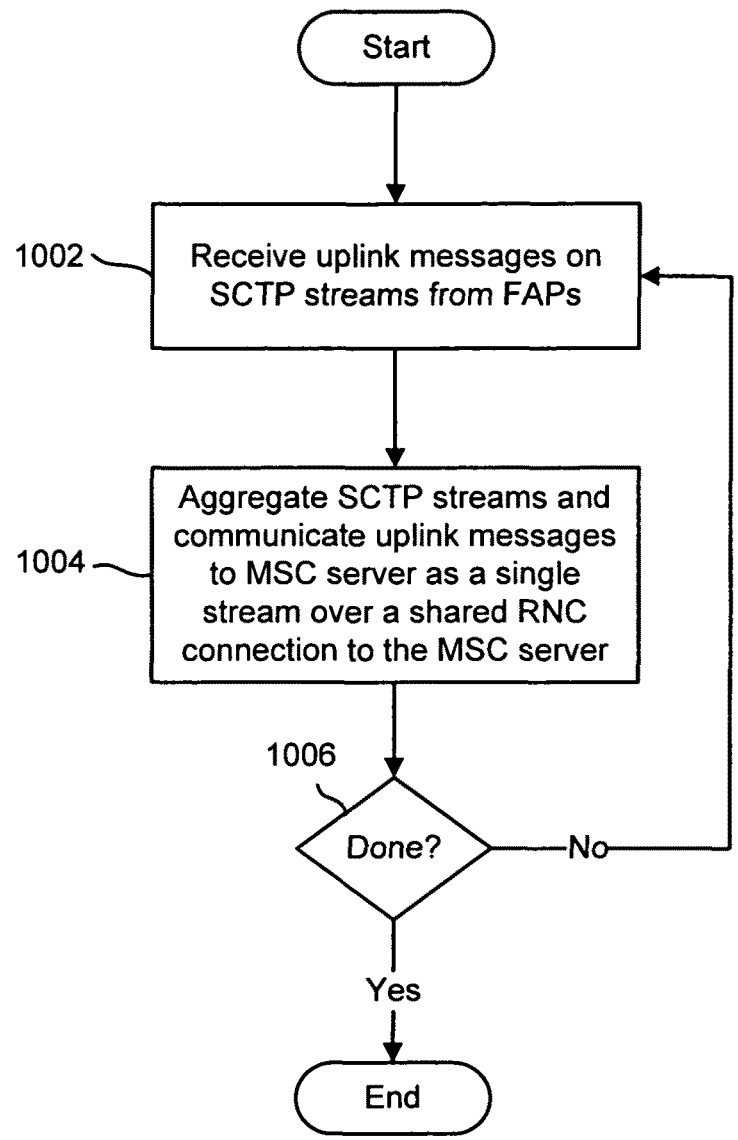
FIG. 10 is a flow diagram illustrating an embodiment of a process for processing uplink messages sent to the MSC server.

FIG. 10 is a flow diagram illustrating an embodiment of a process for processing uplink messages sent to the MSC server. In various embodiments the process of FIG. 10 is implemented by each of one or more femto gateways, each configured to present to the MSC server as a single logical RNC a plurality of femtocells or other FAP's configured to perform one or more RNC functions. In the example shown, uplink messages are received on a plurality of SCTP streams, e.g., SCTP over IP connections, each associated with a corresponding FAP configured to perform at least some RNC functions (1002). The uplink messages are aggregated and sent via a single RNC connection to the MSC server (1004). The process continues until messages are no longer being received, e.g., the femto gateway is taken out of service (1006).

Using the approach disclosed herein each of a very large number of femtocells or other FAP's in the service area of an MSC server may be configured to perform at least some functions traditionally performed by an RNC, potentially exceeding by large margin a maximum number of RNC connections the MSC server may be configured to support, thereby supporting in home or other deployment of a large number of femtocells or other base stations without requiring changes to legacy MSC servers.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing mobile telecommunications, comprising:
   receiving, by a gateway that aggregates a plurality of radio network controllers over a shared radio network controller connection to a mobile switching center (MSC) server, via a first communication interface associated with the shared radio network controller connection to the MSC server, uplink messages from respective ones of a plurality of small scale base stations, the uplink messages comprising data from different sources;
   aggregating, by the gateway, the uplink messages;
   transmitting, by the gateway, all of the aggregated uplink messages as a single stream to the MSC server via the shared radio network controller connection;
   receiving, by the gateway, a downlink mobile telecommunications signaling message; and
   mapping, by the gateway, the downlink mobile telecommunications signaling message to one of the plurality of small scale base stations, the small scale base stations being configured to perform functions of the plurality of radio network controllers.

2. The method of claim 1, further comprising:
   routing the downlink mobile telecommunications signaling message to the one of the plurality of small scale base stations over Internet,
   wherein the mapping, by the gateway, comprises associating a snooped signaling connection control part (SCCP) identifier with a stream control transmission protocol (SCTP) stream that is associated with the one of the plurality of small scale base stations.

3. The method of claim 2, wherein routing the downlink mobile telecommunications signaling message to the one of the plurality of small scale base stations comprises associating the downlink mobile telecommunications signaling message via a communication protocol stream associated with the one of the plurality of small scale base stations.

4. The method of claim 1, wherein:
   the one of the plurality of small scale base stations comprises a femtocell;
   the plurality of radio network controllers comprise universal mobile telecommunications system (UMTS) radio network controllers; and the first communication interface comprises a network interface.

5. The method of claim 1 wherein the shared radio network controller connection comprises one or more of the following:
   an asynchronous transfer mode (ATM) connection;
   an SCTP over internet protocol (IP); or
   another IP or other network connection.

6. The method of claim 1 wherein each of the small scale base stations is configured to establish communication with the MSC server via one or more signaling protocols associated with a RNC or other radio network controller.

7. The method of claim 1 further comprising establishing a mapping between an identifier associated with the one of the plurality of small scale base stations and a downlink communication protocol stream associated with the one of the plurality of small scale base stations.

8. The method of claim 7 wherein the establishing the mapping comprises storing in a mapping data structure the identifier and data associating the downlink communication protocol stream with the identifier.

9. The method of claim 1 wherein mapping the downlink mobile telecommunications signaling message to the one of the plurality of small scale base stations comprises reading from the downlink mobile telecommunications signaling message an identifier associated with the one of the plurality of small scale base stations.

10. The method of claim 9 further comprising using the identifier to read from a stored data structure corresponding data identifying a downlink communication interface associated with the one of the plurality of small scale base stations.

11. The method of claim 1, wherein the shared radio network controller connection comprises one or more connections corresponding to fewer than a total of the plurality of small scale base stations and a total number of radio network controller connections supported by the MSC server.

12. The method of claim 1, wherein the shared radio network controller connection comprises a single shared radio network controller connection.

13. A mobile telecommunication femto gateway system, comprising:
   a first communication interface associated with a single shared radio network controller connection to a mobile switching center (MSC) server, wherein the gateway aggregates a plurality of radio network controllers over the single shared network controller connection to the MSC server; and
   a processor coupled to the first communication interface and configured to:
      receive from respective ones of a plurality of small scale base stations uplink messages, the uplink messages comprising data from different sources;
      aggregate all of the uplink messages;
      transmit all of the aggregated uplink messages as a single stream to the MSC server via the single shared radio network controller connection;
      receive via the first communication interface a downlink mobile telecommunications signaling message; and
      map the downlink mobile telecommunications signaling message to one of the plurality of small scale base stations, the small scale base stations being configured to perform functions of the plurality of radio network controllers.

14. The system of claim 13 wherein the processor is further configured to route the downlink mobile telecommunications signaling message to the one of the plurality of small scale base stations over the Internet, wherein the mapping, by the gateway, includes associating a snooped signaling connection control part (SCCP) identifier with a stream control transmission protocol (SCTP) stream that is associated with one of the plurality of small scale base stations.

15. The system of claim 13 wherein the processor is further configured to establish a mapping between an identifier associated with the one of the plurality of small scale base stations and a downlink communication protocol stream associated with the one of the plurality of small scale base stations.

16. The system of claim 13 wherein the processor is further configured to map the downlink mobile telecommunications signaling message to the one of the plurality of small scale base stations at least in part by reading from the downlink mobile telecommunications signaling message an identifier associated with the one of the plurality of small scale base stations.

17. The system of claim 16 wherein the processor is further configured to use the identifier to read from a stored data structure corresponding data identifying a downlink communication interface associated with the one of the plurality of small scale base stations.

18. A computer program product for providing mobile telecommunications, the computer program product being embodied in a non-transitory computer readable storage medium and comprising computer instructions for:
   receiving, by a gateway that aggregates a plurality of radio network controllers over a shared radio network controller connection to a mobile switching center (MSC) server, via a first communication interface associated with the shared radio network controller connection to the MSC server, uplink messages from respective ones of a plurality of small scale base stations, the uplink messages comprising data from different sources;
   aggregating, by the gateway, the uplink messages;
   transmitting, by the gateway, all of the aggregated uplink messages as a single stream to the MSC server via the shared radio network controller connection;
   receiving, by the gateway, a downlink mobile telecommunications signaling message;
   mapping, by the gateway, the downlink mobile telecommunications signaling message to one of the plurality of small scale base stations, the small scale base stations being configured to perform functions of the plurality of radio network controllers; and
   routing the downlink mobile telecommunications signaling message to the one of the plurality of small scale base stations over the Internet, wherein the mapping, by the gateway, comprises associating a snooped signaling connection control part (SCCP) identifier with a stream control transmission protocol (SCTP) stream that is associated with one of the plurality of small scale base stations.

19. The computer program product of claim 18, wherein the shared radio network controller connection comprises one or more connections corresponding to fewer than a total of the plurality of small scale base stations and a total number of radio network controller connections supported by the MSC server.

20. A small scale mobile telecommunications base station, comprising:
   a communication interface; and
   a processor coupled to the communication interface and configured to:
      establish with a femto gateway via the communication interface a first communication session under a first mobile telecommunications signaling protocol, wherein the femto gateway establishes a mapping that associates a snooped signaling connection control part (SCCP) identifier with a stream control transmission protocol (SCTP) stream associated with the small scale mobile telecommunications base station, wherein the small scale mobile telecommunications base station is configured to perform functions of a corresponding radio network controller (RNC);

establish with a mobile switching center (MSC) server, through communications sent to the MSC server via the femto gateway using the first communication session, a second communication session under a second mobile telecommunications signaling protocol associated with functionality, wherein the femto gateway is configured to aggregate uplink messages from a plurality of small scale mobile telecommunications base stations over a single shared RNC connection to the MSC server, the uplink messages comprising data from different sources; and send to the MSC server, via the femto gateway using the first communication session, all of the aggregated uplink messages associated with the second communication session as a single stream.

\* \* \* \* \*